Aug. 4, 1953
J. P. ARENA
2,647,660
METERING LIQUID DISPENSER AND RECORDER
Filed Nov. 3, 1951
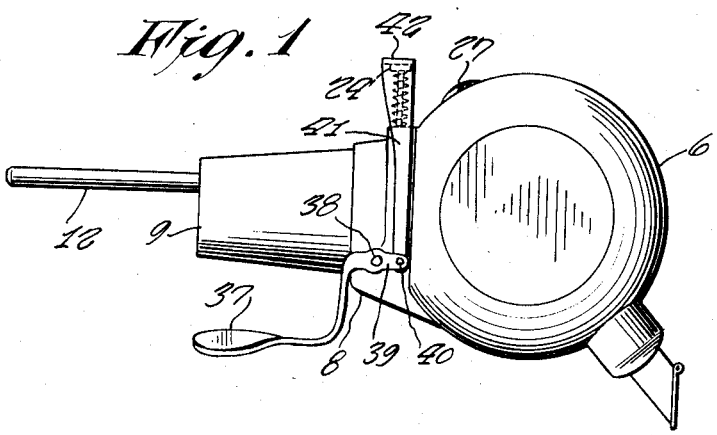
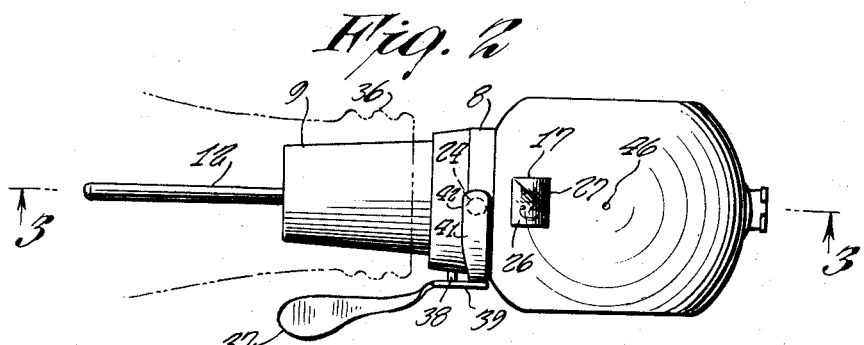
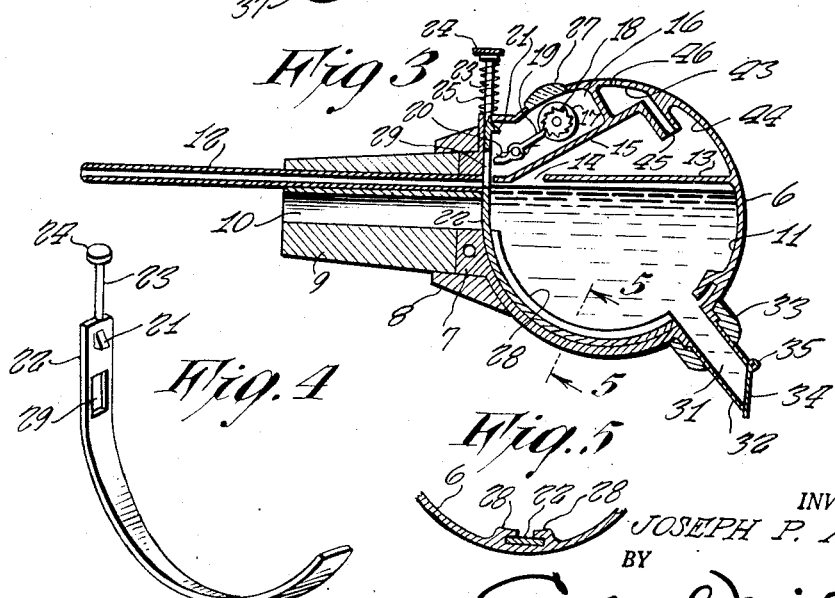
INVENTOR.
JOSEPH P. ARENA
BY
Carl Miller
ATTORNEY Patented Aug. 4, 1953

2,647,660

UNITED STATES PATENT OFFICE 2,647,660

METERING LIQUID DISPENSER AND RECORDER

Joseph P. Arena, Astoria, N. Y.

Application November 3, 1951, Serial No. 254,726

7 Claims. (Cl. 222—38)

The present invention relates to dispensing devices for dispensing liquids from bottles and containers, and particularly to what I choose to term a metering liquid dispenser.

The main object of my invention is to provide means for dispensing liquid from a bottle or like container in controlled manner.

Another object of the invention is to provide a bottle or the like with a dispensing device for the contents thereof that will not only control the pouring from the bottle but also limits the total amount that may be poured at any one pouring.

A further object is to have a dispensing device for a bottle that may be inserted like a stopper into the neck thereof whereafter the bottle will automatically measure and allow a single predetermined amount of liquid to be poured from the device each time the bottle is tilted for pouring.

It is also an object to have the dispensing device of the invention provided with means for indicating the number of doses of liquid that have been poured from the bottle equipped with the device.

In addition, an object of the invention is to have manual control means upon such a dispensing device that serves to start the dispensing of a single predetermined quantity or dose of the liquid at will.

An ancillary object is to have such a dispensing device provided with a metering chamber for receiving from the bottle upon operation of the manual control means a predetermined amount of liquid that is thereafter the sole amount dispensed from the device.

An important object is, of course to have a dispensing device of the character indicated that is simple to apply to a bottle and simple to use, and yet certain to operate effectively to measure and dispense predetermined doses and amounts of liquid from a bottle or container until the bottle is empty.

It is, of course, a practical object to have a bottle equipped with such a dispensing device which is simple in form and construction and removable from one bottle when empty to another that is full for use upon the latter until it also is empty, and so on.

Other objects and advantages of the invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a metering dispensing device made according to the invention and embodying the same in a practical form;

Figure 2 is a top or plan view of the same dispensing device;

Figure 3 is a longitudinal section of the device as taken on line 3—3 in Figure 2;

Figure 4 is a perspective view of a sliding shutter of the device which is normally concealed within the same; and Figure 5 is a fragmentary section taken on line 5—5 in Figure 3.

Throughout the views, the same reference numerals indicate the same or like parts.

When dispensing liquids, for example, beverages from bottles, it is frequently desirable to dispense accurate amounts of beverage from a bottle, so that it can be known beforehand how many drinks are to be expected from the one bottle, not to mention that it is often also important that the amounts are invariable and equal each time a dose is dispensed. Such conditions are certainly important when dispensing medicinal drinks or doses of liquids that are either potent or expensive or both. Despite the importance of such considerations, no practical and simple dispensing device for such all around use has been generally adopted.

Upon consideration of this problem, it has occurred to me that a simple and effective metering and recording dispensing device for a bottle should be highly desirable in several fields of use. As a result, I have succeeded in producing a metering dispensing device along the lines already mentioned, as will now be more fully set forth in the following.

Hence, in the practice of my invention, and referring also again to the drawing, a generally rounded hollow body member 6 has a neck portion 7 surrounded by a reinforcing collar 8 by which it is connected to a hollow stopper or plug member 9 of more or less yieldable material such as cork, plastic composition, rubber, or the like. The stopper member has a bore 10 communicating directly through the neck 7 with the main interior chamber 11 of body member 6. Extending parallel to the bore 10 and projecting a distance out from plug 9 is an air vent tube 12 passing through the plug or stopper to the interior chamber 11. Above this chamber is a partition 13 which serves as a trap or choker plate to prevent any further flow of the liquid from a container, inasmuch as the air is cut off from the air vent tube 12 and extending from the outer end wall of body member 6 inwardly toward the neck portion 7 substantially parallel to the bore 10 therein, but leaving an opening 14 between the end of this partition and the inner wall 15 of a meter chamber 16. In this chamber 16 is located a rotatable meter or indicator 17 having a sprocket 18 operated by a pivotally mounted finger 19 upon which the shorter end 20 is adapted to be moved downwardly by a projection 21 upon a sliding member 22.

The sliding member 22 serves several purposes, being flexible and preferably a metal band or strip provided at the top with an operating push rod 23 capped by a head 24 and provided with a return spring 25 engaging beneath the head and upon the circular body member 6. If the head is pushed down by any means, the projection 21 will depress short end 20 of the operating finger 19 and will thereby raise the latter and rotate indicator 17 by the feeding of one tooth on the sprocket 18, after which the spring 25 again raises the push rod and its head 24 to original operative position. The meter or indicator is provided about its periphery with a series of numbers 26 and has a glass or other window 27 in the body member 6 for viewing the number in position beneath this window, each number representing a dose of the liquid dispensed from the device.

Within the hollow body member is a curved slide guide formed of two opposite curved flanges 28, 28 in which the sliding shutter member 22 is adapted to be moved upon depression of head 24 on rod 23. This sliding member has an aperture 29 adapted in depressed position of the shutter 22 to register with the bore 10 of stopper member 9 at its inner end and thereby provide free communication between this bore and the interior of the body member 6. The far end of this shutter 22 then projects forward into a pocket 30 within chamber 11 and shuts off the outlet passage 31 in a spout 32 reinforced by a collar 33 on the mentioned body member. To the outer end of this spout is hinged a closing member 34 by hinge means 35.

If it is assumed that the stopper member 9 is thrust into a bottle neck indicated at 36 and the bottle tilted to a horizontal position as shown in Figures 2 and 3, normally, the liquid in the bottle will be stopped from entering chamber 11 in body member 6 by shutter 22 because the aperture 29 therein is disposed above the level of bore 10 of the stopper 9. In order to depress the push rod 23 in proper operative manner to bring down the aperture 29 in the shutter and allow fluid to flow into chamber 11 from the bottle 36, a trigger 37 is pivoted at 38 to reinforcing collar 8 of the device and has a short end 39 pivotally connected to the lower end of a link 41 provided with an upper hooked end 42 that fits upon head 24 of push rod 23.

When the bottle is held in the hand, preferably by the neck 36, a finger may be used to press on trigger 37 to bring it closer to this neck, this movement drawing down link 41 and depressing push rod 23 and shutter 22. The immediate result is that the spout passage is cut off at 31 by the far end of the shutter 22 while the aperture 29 in the shutter freely allows the chamber 11 in member 6 to be filled with liquid up to partition 13. Release of the trigger 37 will then allow spring 25 to raise the push rod and return shutter 22 to closing position with respect to bore 10, but open position with respect to spout passage 31, so that the fluid measured by the chamber 11 will be dispensed through spout 32. In order to facilitate free flow of liquid into and then out from chamber 11, an aspirating chamber 43 is included within member 6 above partition 13 to provide an intermediate buffer chamber 44 into which a spout 45 from chamber 43 projects, the opening 14 providing communication between buffer chamber 44 and main measuring chamber 11. In addition, an opening 46 is provided in the outer wall of body member 6 for admission or escape of air from the buffer chamber, so that filling and thereafter emptying of the main chamber 11 will be quickly effected.

Manifestly, variations may be resorted to, and parts and features may be modified or used without others within the scope of the appended claims.

Having now fully described my invention, I claim:

1. A metering liquid dispenser adapted to be inserted into or connected to the neck of an open bottle, including a hollow body member, a stopper member rigidly connected to the body member and having an open bore communicating directly with the interior chamber of the body member, a dispensing spout projecting from a portion of said body member remote from the stopper member and also communicating with the chamber within said body member, manually operable means for simultaneously opening communication between the mentioned chamber and the spout and closing communication between the bore in said stopper member and said chamber and vice versa, a metering device enclosed within said body member out of contact with liquid passing into and out of said chamber and having a window in the wall of said body member for visual inspection of said metering device, and a projection upon the manually operated means for operating said metering device during each operative stroke of said manually operated means to record the stroke of said device, wherein the manually operated means includes a slidable shutter having an operating push rod extending to the exterior of said circular body member, a guide within the latter for retaining the shutter in a position in which the end thereof is slidable across the passage in the spout or away from the same and the shutter has an aperture in another portion thereof capable of registering with the bore in the stopper member or being withdrawn from said bore upon sliding movement of said shutter member, a trigger pivoted upon the exterior of said body member, a return spring mounted on the push rod for returning it to original position when the trigger is released, the projection for operating the metering device being fixed on said shutter member, and a link connected at one end to the trigger and at the other end connected to the push rod for depressing it by means of the trigger.

2. A metering liquid dispenser according to claim 1, wherein a partition is disposed within the body member and divides the interior into a main metering chamber and a buffer chamber having a limited opening into the main chamber and a limited opening to the atmosphere through the outside wall of said body member.

3. A metering dispensing device according to claim 2, wherein the stopper member has an air vent tube extending independently into the same from a point spaced a short distance beyond the outer end of said stopper member and at the inner end terminating in open condition at the inner end of the bore in said stopper member at the point where the bore communicates with the main metering chamber within said body member.

4. A metering liquid dispenser according to claim 2, wherein above the chamber there is a partition which serves as a trap or choker plate to prevent any further flow of the liquid from a container, inasmuch as the air is cut off from the air vent tube.

5. A metering dispensing device according to claim 3, wherein the body member has an aspirating chamber adjacent to the buffer chamber with an opening communicating therewith and has the opening to the atmosphere in the outer wall thereof.

6. A metering dispensing device according to claim 5, wherein the aspirating chamber has a spout forming the opening therein communicating with the buffer chamber, the spout projecting into said buffer chamber.

7. A metering dispensing device according to claim 6, wherein the shutter member forms an inner closure in one operated position thereof for the dispensing spout of the device and the latter has an outer closure hinged thereto at the outer end thereof.

JOSEPH P. ARENA.

References Cited in the file of this patent

UNITED STATES PATENTS

| Number | Name | Date |
|---|---|---|
| 2,209,766 | Dale et al. | July 30, 1940 |
| 2,473,462 | Wortman | June 14, 1949 |

FOREIGN PATENTS

| Number | Country | Date |
|---|---|---|
| 433,809 | Germany | Sept. 9, 1926 |